United States Patent [19]

Tsai et al.

[11] Patent Number: 5,114,798
[45] Date of Patent: May 19, 1992

[54] MEMORY DISC LUBRICATED BY N-ACYL SARCOSINE DERIVATIVE

[75] Inventors: Mei-Yuan Tsai, Murrysville; Vincent A. Paola, Jeannette, both of Pa.

[73] Assignee: Aluminum Company of America, Pittsburgh, Pa.

[21] Appl. No.: 717,468

[22] Filed: Jun. 19, 1991

[51] Int. Cl.⁵ .................. G11B 5/70; H01F 10/00
[52] U.S. Cl. .................... 428/611; 428/624; 428/652; 428/695; 428/928
[58] Field of Search ............. 428/611, 650, 651, 652, 428/695, 624, 928

[56] References Cited

U.S. PATENT DOCUMENTS

| | | | |
|---|---|---|---|
| 3,778,308 | 12/1973 | Roller et al. | 117/234 |
| 4,153,754 | 5/1979 | Huisman | 428/539 |
| 4,268,556 | 5/1981 | Pedrotty | 428/695 |
| 4,391,877 | 7/1983 | Shibata et al. | 428/695 |
| 4,396,674 | 8/1983 | Somezawa et al. | 428/695 |
| 4,649,072 | 3/1987 | Ryoke et al. | 428/212 |
| 4,929,514 | 5/1990 | Natarajan et al. | 428/611 |

Primary Examiner—John Zimmerman
Assistant Examiner—Valerie A. Lund
Attorney, Agent, or Firm—Glenn E. Klepac

[57] ABSTRACT

A recording medium lubricated with a thin film of a substituted N-acyl sarcosine. The lubricant is dissolved in a volatile organic solvent (preferably hexane) and coated onto the recording medium. A particularly preferred lubricant is N-oleoyl sarcosine.

18 Claims, 2 Drawing Sheets

MEMORY DISC LUBRICATED BY N-ACYL SARCOSINE DERIVATIVE

BACKGROUND OF THE INVENTION

The present invention relates to a method for providing lubrication on a recording medium and to the lubricated medium produced by such method.

DESCRIPTION OF THE PRIOR ART

Memory discs used for mass storage of data in the computer industry are typically provided with magnetic or optically readable memory indicia.

A commercially available metal magnetic memory disc is manufactured by stamping a metal blank from a metal strip, mechanically machining the blank, and then coating the blank with various layers including at least one magnetic memory layer comprising memory indicia. A wear layer is deposited upon the magnetic memory layer, and then a lubricating coating is applied on top of the wear layer. It is very important that the lubricant be long lasting because breakdown of the lubricant can result in interference between the disc and read-write head, resulting in a so-called "head crash".

Lubricants for recording media are known in the prior art. However, such prior art lubricants each suffer from various deficiencies making them less than entirely adequate for their intended purpose.

A commonly used lubricant for magnetic recording members is described in Roller et al U.S. Pat. No. 3,778,308. Roller et al describe their lubricant as a thin outer coating of a friction-modifying abrasion-resistant perfluoroalkyl polyether. Perfluoroethyl and perfluoroisopropyl polyethers are preferred. Such polyethers are commercially available under the trade name Fomblin AM 2001. These lubricants are dissolved in chlorofluorocarbon solvents, which are being phased out of use because of environmental concerns.

Although the perfluoroalkyl polyether lubricants perform adequately, they are very expensive. Accordingly, there is a need to provide a less expensive lubricant for recording media having friction, wear, and anti-corrosion properties equal to or better than the perfluoroalkyl polyethers.

Huisman U.S. Pat. No. 4,153,754 discloses a magnetic tape having a magnetizable coating comprising a binder, magnetizable pigment particles, and a dispersing agent. The magnetizable particles may be iron powder, $Fe_2O_3$ particles or $CrO_2$ particles having approximate sizes of 0.1–1 microns x 0.01–0.2 microns. The dispersing agent may include N-acyl sarcosine derivatives and salts thereof. The magnetizable coating described by Huisman is unsuitable for use as a lubricant film on a hard disc because the magnetizable particles would frictionally abrade the sputtered carbon wear layer typically applied to such discs.

A principal objective of the present invention is to provide a lubricated recording medium having improved friction, wear, and anti-corrosion properties compared with prior art recording media.

A related objective of the invention is to provide a method for lubricating a recording medium that does not require a halogenated hydrocarbon solvent.

Another objective of the invention is to provide a recording medium lubricant that is less expensive than prior art lubricant compositions.

Additional objectives and advantages of the present invention will become apparent to persons skilled in the art from the following detailed description.

SUMMARY OF THE INVENTION

In accordance with the present invention, there is provided a recording medium comprising a solid substrate, a memory layer supported by the solid substrate, and an organic lubricant overlying the recording medium. The substrate may be metal, glass, or a polymer with aluminum alloys being particularly preferred. The memory layer contains memory indicia which may be encoded by magnetic or optical means. A particularly preferred magnetic memory layer comprises a thin film containing cobalt applied by electroless plating deposition or vacuum sputtering. The magnetic memory layer may also take the form of iron oxide particles or other magnetizable particles suspended in an organic medium. In a preferred embodiment, a wear layer, preferably sputtered carbon, overlies the magnetic memory layer.

The organic lubricant comprises a film of a substituted N-acyl sarcosine having the formula

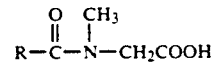

wherein R is a saturated or unsaturated aliphatic group having at least 12 carbon atoms.

The organic lubricant is applied to the recording medium as a solution in a volatile organic solvent which can dissolve the N-acyl sarcosine. The solution contains less than 2 wt% of the lubricant, preferably less than 1 wt%. Solutions containing about 0.3–0.7 wt% of the lubricant are particularly preferred.

The lubricant of the invention may also contain a non-polar synthetic oil. Some suitable synthetic oils are polyalphaolefins, polybutenes, and polyisobutenes. Polyalphaolefins are particularly preferred. The synthetic oil is also dissolved in the volatile solvent, preferably in a concentration of about 0.1–2 wt% and more preferably about 0.2–1 wt%. The synthetic oil is believed to improve corrosion resistance because it is hydrophobic.

Some suitable solvents are hydrocarbons such as hexane and heptane; lower aliphatic alcohols such as methanol, ethanol, and isopropanol; lower aliphatic ketones such as acetone; and toluene. Hexane is the particularly preferred solvent.

The organic lubricant should be essentially free of particulate matter. As used herein, the term "particulate matter" refers to solid particles having greater hardness than the lubricant film of the present invention. It is important to avoid such hard solid particles in order to minimize frictional abrasion of the wear layer.

The dilute lubricant solution may be applied onto the recording medium by any of several means including spraying, brushing, wiping, or dipping. The dipping technique is preferred.

The solvent is evaporated, leaving a thin lubricant coating. The coating has a thickness of less than about 300 angstroms, generally less than 100 angstroms. A particularly preferred coating has a thickness of approximately 20–30 angstroms.

DETAILED DESCRIPTION OF A PREFERRED EMBODIMENT

Figure 1:
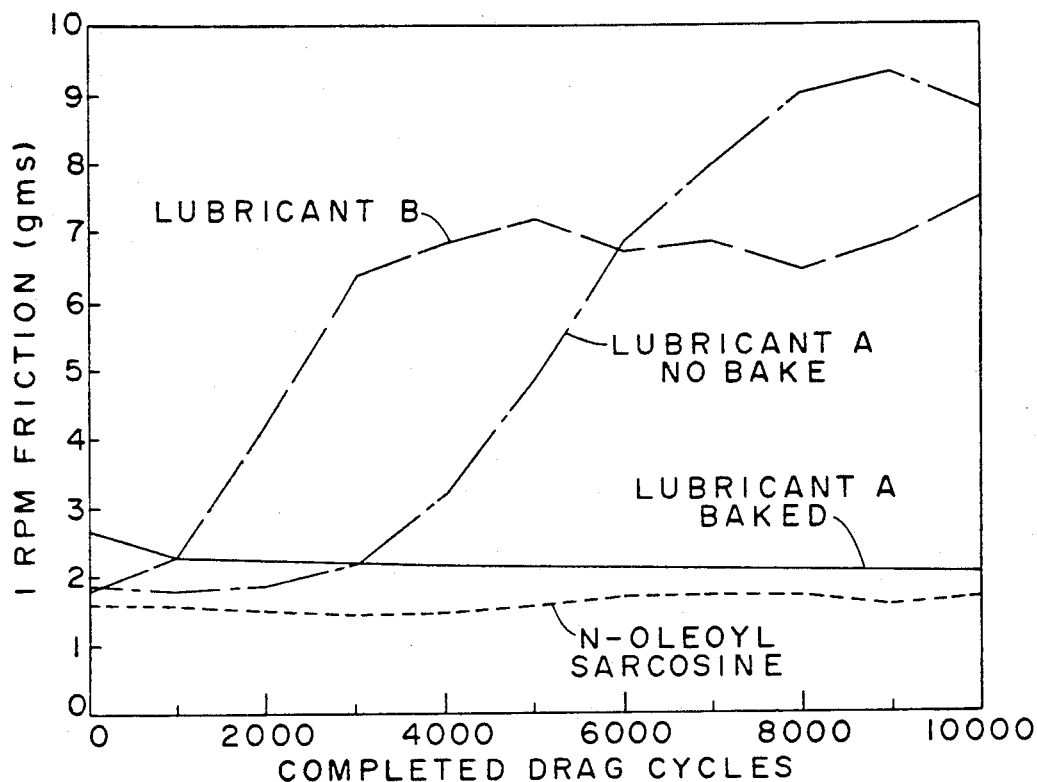
FIG. 1 is a graph of 1 rpm friction as a function of the number of drag cycles completed for hard discs lubricated in accordance with the present invention and the prior art.

The recording medium and lubricating method of the present invention are described below in detail with reference to a particularly preferred embodiment.

The preferred recording medium has a substrate comprising an aluminum alloy, preferably an alloy of the 5000 Series. A 5086 (Aluminum Association Series) alloy is particularly preferred. The substrate is made by blanking from sheet material, then flattening the disc thereby obtained. Thereafter, the substrate is rough machined and then fine machined or polished to a high level of smoothness, e.g., less than about 250 angstroms surface roughness, often referred to as a mirror-like finish. The polished substrate is treated to activate its surface so that coatings deposited on it will have a high level of adhesion. One suitable form of activation comprises treatment with acidified metal salt solutions, then rinsing to remove excess solution.

A hard underlayer is applied to the activated aluminum surface as a base for a memory layer. The hard underlayer is preferably a nickel-phosphorus coating that is deposited from a nickel sulfate-hypophosphite electrolyte. Alternatively, the hard underlayer may be sputtered chromium. The hard underlayer typically has a thickness of about 10-25 microns.

A memory layer is applied over the hard underlayer. In the preferred magnetic medium, the memory layer comprises a thin film of cobalt or similar material which is suitable for magnetic encodation of memory indicia. A cobalt-phosphorus thin film is normally applied by electroless plating deposition as disclosed in U.S. Pat. No. 3,138,479, the disclosure of which is incorporated herein by reference. Other suitable magnetic memory materials such as cobalt-chromium thin films may also be employed in the memory layer.

A wear layer or protective layer is applied over the memory layer to increase the disc's useful life. The protective layer normally is carbon, applied by known sputtering techniques. Other suitable protective layer materials are silica, zirconia, magnesia, boron nitride, alumina, titanium carbide, and titanium diboride.

In order to reduce friction and abrasive wear on the protective layer during use, the recording medium is lubricated with a substituted N-acyl sarcosine. The lubricant is applied to the disc as a thin film.

In the preferred embodiment, N-oleoyl sarcosine is dissolved in hexane to form a dilute (0.5 wt%) solution. A magnetic recording medium is dipped into the solution and hexane is evaporated, leaving a thin lubricant film overlying the outer wear layer of sputtered carbon.

The lubricant film of the invention was compared with three different prior art lubricants with respect to friction, stiction, and anti-corrosion properties. A first prior art lubricant (Lubricant A) was employed as a 0.5 wt% solution in a chlorofluorocarbon solvent with and without baking at an elevated temperature. A second prior art lubricant (Lubricant B) consisted of a 0.5 wt% solution of a perfluoroalkyl polyether in a chlorofluorocarbon solvent. Lubricant B and the lubricant of the present invention do not require any elevated temperature baking.

Figure 2:
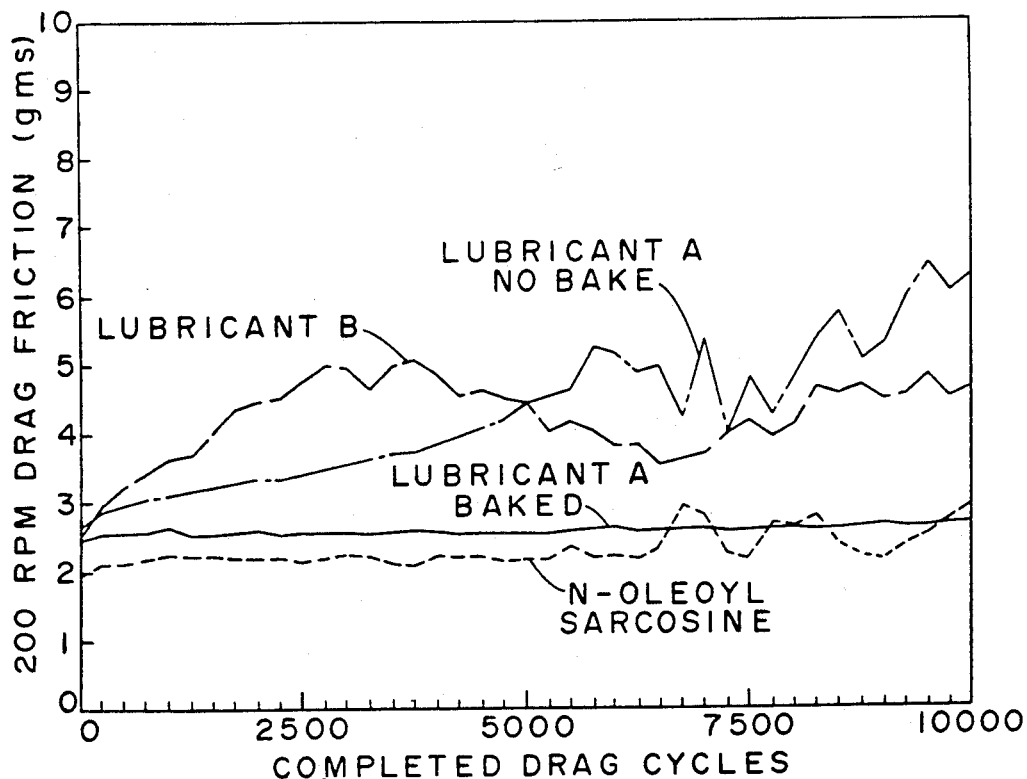
FIG. 2 is a graph of 200 rpm drag friction as a function of the number of drag cycles completed for hard discs lubricated in accordance with the present invention and the prior art.

All four lubricants were applied to identical 130 mm (5¼ in) diameter magnetic hard discs with a test radius of 30 mm (1.2 in). Friction was measured at 1 rpm and at 200 rpm. Results are shown in FIGS. 1 and 2. The N-oleoyl sarcosine lubricant generally performed best of all four compositions tested.

Figure 3:
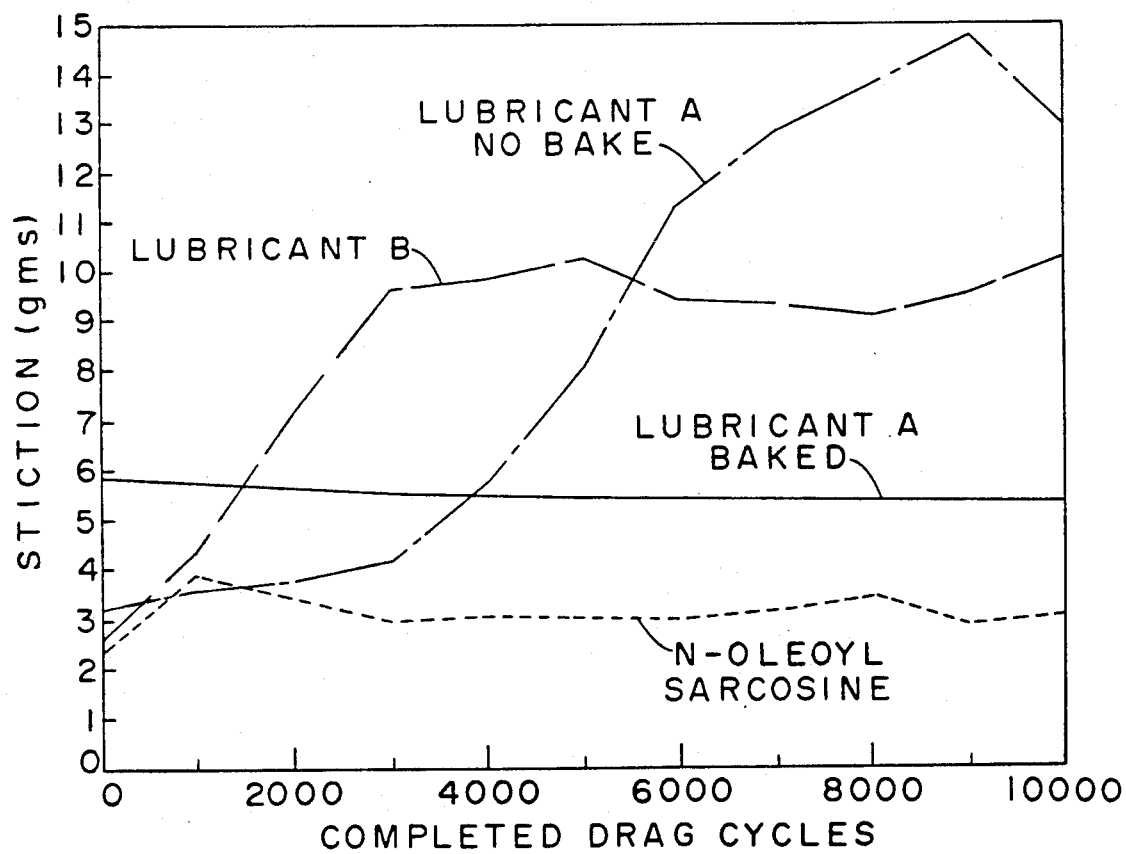
FIG. 3 is a graph of stiction as a function of the number of drag cycles completed for hard discs lubricated in accordance with the present invention and the prior art.

As used herein the term "stiction" refers to the force in grams required to start movement of the test disc, recorded at 1 rpm. Results of the stiction test are shown in FIG. 3. Again, the N-oleoyl sarcosine lubricant outperformed all others over most of the test range.

Anti-corrosion properties were tested by exposing test and control discs to an 80% relative humidity atmosphere at 60° C. in a closed container for one day. Error growth was determined by measuring differences in magnetic moment loss, both before and after exposure to the high humidity atmosphere. The disc lubricated with N-oleoyl sarcosine showed anti-corrosion properties at least comparable to discs lubricated with the other lubricants.

While the invention has been described in terms of preferred embodiments, the claims appended hereto are intended to encompass all embodiments which fall within the spirit of the invention.

What is claimed is:

1. A recording medium comprising:
   (a) a solid substrate;
   (b) a memory layer supported by said solid substrate, and
   (c) an organic lubricant overlying said recording medium, said organic lubricant comprising a film of a substituted N-acyl sarcosine having the formula consisting essentially of

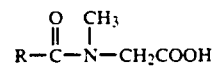

wherein R is saturated or unsaturated aliphatic group having at least 12 carbon atoms, said organic lubricant being essentially free of particulate matter.

2. A recording medium as claimed in claim 1 wherein said memory layer is a magnetic memory layer, said recording medium further comprising:
   (d) a wear layer overlying said magnetic memory layer.

3. A recording medium as claimed in claim 2 wherein said wear layer comprises sputtered carbon.

4. The recording medium of claim 3 wherein said lubricant film has a thickness of less than 100 angstroms.

5. A recording medium as claimed in claim 1 wherein said film has a thickness of less than about 300 angstroms.

6. A recording medium as claimed in claim 1 wherein said organic lubricant is dissolved in an organic solvent to form a solution containing less than 2 wt% of the lubricant, said solution is coated onto the substrate, and said solvent is evaporated to form a film.

7. A recording medium as claimed in claim 1 wherein R contains about 12-22 carbon atoms.

8. A recording medium as claimed in claim 1 wherein R is selected from the group consisting of oleoyl, linoleoyl, stearoyl, myristoyl, lauroyl, and cocoyl groups.

9. The recording medium of claim 3 wherein said lubricant film has a thickness of less than 100 angstroms.

10. A recording medium as claimed in claim 1 wherein R is an oleoyl group.

11. A recording medium as claimed in claim 1 wherein said lubricant further comprises a non-polar synthetic oil.

12. The recording medium of claim 1 wherein said film has a thickness of less than 100 angstroms.

13. The recording medium of claim 1 wherein said lubricant film has a thickness of approximately 20-30 angstroms.

14. A hard disc comprising:
(a) an aluminum alloy substrate;
(b) a magnetic memory layer supported by said substrate;
(c) a sputtered carbon wear layer overlying said magnetic memory layer; and
(d) an organic lubricant film overlying said wear layer, said lubricant film consisting essentially of a substituted N-acyl sarcosine having the formula $$R-\overset{O}{\underset{\|}{C}}-\overset{CH_3}{\underset{|}{N}}-CH_2COOH$$

wherein R is a saturated or unsaturated aliphatic group having at least 12 carbon atoms said lubricant film being essentially free of any particulate matter.

15. The hard disc of claim 14 further comprising:
(e) a hard underlayer supported by said substrate, said underlayer supporting said memory layer.

16. The hard disc of claim 14 wherein said N-acyl sarcosine is N-oleoyl sarcosine.

17. The hard disc of claim 14 wherein said lubricant film has a thickness of less than 100 angstroms.

18. The hard disc of claim 14 wherein said lubricant film has a thickness of approximately 20-30 angstroms.

* * * * *